US010065680B2

(12) United States Patent
Yu et al.

(10) Patent No.: US 10,065,680 B2
(45) Date of Patent: Sep. 4, 2018

(54) METHOD OF BUILDING SMART AND VEHICLE CONTROL MODEL, AND METHOD AND APPARATUS FOR CONTROLLING SMART VEHICLE

(71) Applicant: BAIDU ONLINE NETWORK TECHNOLOGY (BEIJING) CO., LTD., Beijing (CN)

(72) Inventors: Li Yu, Beijing (CN); Tianlei Zhang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 75 days.

(21) Appl. No.: 15/280,757

(22) Filed: Sep. 29, 2016

(65) Prior Publication Data
US 2017/0361873 A1    Dec. 21, 2017

(30) Foreign Application Priority Data

Jun. 17, 2016 (CN) .......................... 2016 1 0439391

(51) Int. Cl.
   *B62D 15/02* (2006.01)
   *G05B 13/02* (2006.01)
   *G06N 3/08* (2006.01)
(52) U.S. Cl.
   CPC ......... *B62D 15/025* (2013.01); *G05B 13/027* (2013.01); *G06N 3/08* (2013.01)
(58) Field of Classification Search
   CPC ....... B62D 15/025; G05B 13/027; G06N 3/08
   See application file for complete search history.

(56) References Cited

U.S. PATENT DOCUMENTS

2002/0128751 A1*  9/2002  Engstrom ............ G05B 13/027
                                                701/1
2008/0071469 A1   3/2008  Caveney
2014/0136053 A1*  5/2014  Watanabe .......... B62D 15/0245
                                                701/41

FOREIGN PATENT DOCUMENTS

CN          102030007 A       4/2011
CN          103035121 A       4/2013
                    (Continued)

OTHER PUBLICATIONS

From Chinese application No. 201610439391.6, Office Action dated Feb. 21, 2017 with English translation from Global Dossier.
(Continued)

*Primary Examiner* — Michael D Lang
(74) *Attorney, Agent, or Firm* — Ladas & Parry, LLP (57) ABSTRACT

The present invention provides a method of building a smart vehicle control model, and a method and apparatus for controlling a smart vehicle, wherein the method of building a smart vehicle control model comprises: acquiring sample data which comprise corresponding steering wheel turning angles under driving environments; extracting vehicle state features and road condition features from the sample data; using the extracted features to train a neural network model to obtain the smart vehicle control model. The method of controlling smart vehicle comprises: extracting vehicle state features and road condition features of a vehicle to be controlled; inputting the extracted features into the smart vehicle control model to obtain a steering wheel turning angle; controlling the vehicle to be controlled using the steering wheel turning angle. The present invention builds the smart vehicle control model in a machine learning manner, does not require manual parameter regulation and reduces man power costs caused by parameter regulation.

18 Claims, 2 Drawing Sheets

(56) References Cited

FOREIGN PATENT DOCUMENTS

| | | |
|---|---|---|
| CN | 104391504 A | 3/2015 |
| CN | 104590274 A | 5/2015 |
| CN | 105136469 A | 12/2015 |
| JP | 4251095 B2 | 4/2009 |

OTHER PUBLICATIONS

From Chinese application No. 201610439391.6, Office Action dated Jun. 27, 2017 with English translation from Google.
From Chinese application No. 201610439391.6, Office Action dated Nov. 1, 2017 with English translation from Global Dossier.
From Chinese application No. 201610439391.6, Search Report dated Feb. 14, 2017 with English translation from Global Dossier.
From Chinese application No. 201610439391.6, Search Report dated Jun. 21, 2017 with English translation from Global Dossier.
From Chinese application No. 201610439391.6, Search Report dated Oct. 24, 2017 with English translation from Global Dossier.

* cited by examiner

METHOD OF BUILDING SMART AND VEHICLE CONTROL MODEL, AND METHOD AND APPARATUS FOR CONTROLLING SMART VEHICLE

CROSS-REFERENCE TO RELATED APPLICATION

This application claims the priority to and the benefit of Chinese Patent Application No. 201610439391.6 filed on Jun. 17, 2016, the disclosure of which is incorporated herein by reference in its entirety.

FIELD OF THE INVENTION

The present invention relates to the technical field of computer application, and particularly to a method of building a smart vehicle control model, and a method and apparatus for controlling a smart vehicle.

BACKGROUND OF THE INVENTION

A smart vehicle is a comprehensive system integrating functions such as environmental perception, planning decision and multi-level assisted driving so that the vehicle has a smart environment perception capability and can automatically analyze security and danger states of the run of the vehicle, and so that the vehicle reaches a destination by a person's will and finally achieves the purpose of operating in place of a driver. In recent years, the smart vehicle has become a development and research hot spot in the field of world vehicle engineering and a new motive power for growth of vehicle industry, and many countries introduce it into their respective smart transportation systems for which they put focus on.

Decision-making and control play a crucial role in a smart vehicle driving system, wherein control of a steering wheel is a type of relatively important control. Current control of the steering wheel of the smart vehicle is mainly based on PID algorithm, i.e., during procedure control, control is performed according to proportion (P), integration (I) and differential (D) of a deviation. However, when control is performed for the steering wheel of the smart vehicle by using this algorithm, a lot of man power needs to be input for parameter regulation on the one hand, and on the other hand, sensors are substantially relied on.

SUMMARY OF THE INVENTION

In view of this, the present invention provides a method of building a smart vehicle control model, and a method and apparatus for controlling a smart vehicle to thereby reduce man power costs caused by parameter regulation.

Specific technical solutions are as follows:

The present invention provides a method of building a smart vehicle control model, the method comprising:

acquiring sample data which comprise corresponding steering wheel turning angles under driving environments;

extracting vehicle state features and road condition features from the sample data;

using the extracted features to train a neural network model to obtain the smart vehicle control model.

According to a preferred embodiment of the present invention, the vehicle state features comprise one of transverse speed, longitudinal speed, and yaw angular speed or any combination thereof;

the road condition features comprise one of a transverse deviation between the vehicle and a reference lane, a heading angle deviation between a heading direction of the vehicle and a reference lane line, and a road curvature or any combination thereof.

According to a preferred embodiment of the present invention, the method further comprises:

performing test evaluation for the smart vehicle control model;

optimizing the smart vehicle control model using an evaluation result.

According to a preferred embodiment of the present invention, the performing test evaluation for the smart vehicle control model comprises:

docking the smart vehicle control model with a vehicle model in a simulated manner, wherein vehicle state features and road condition features are obtained from the vehicle model and input into the smart vehicle control model, and the steering wheel turning angle output by the smart vehicle control model is input into the vehicle model;

performing test by simulating various driving environments;

comparing test results with anticipated results.

According to a preferred embodiment of the present invention, the optimizing the smart vehicle control model using an evaluation result comprises:

considering test data that the test results complies with the anticipated results as sample data, and performing iterative optimization for the smart vehicle control model.

The present invention further provides a smart vehicle control method, comprising:

extracting vehicle state features and road condition features of a vehicle to be controlled;

inputting the extracted features into the smart vehicle control model to obtain a steering wheel turning angle;

controlling the vehicle to be controlled using the steering wheel turning angle;

wherein the smart vehicle control model is built by using the above method of building the smart vehicle control model.

According to a preferred embodiment of the present invention, the vehicle state features comprise one of transverse speed, longitudinal speed, and yaw angular speed or any combination thereof;

the road condition features comprise one of a transverse deviation between the vehicle to be controlled and a reference lane, a heading angle deviation between a heading direction of the vehicle to be controlled and a reference lane line, and a road curvature or any combination thereof.

According to a preferred embodiment of the present invention, the controlling the vehicle to be controlled using the steering wheel turning angle comprises:

judging whether the steering wheel turning angle is smaller than or equal to a preset turning angle threshold; if no, using the steering wheel turning angle to control the vehicle to be controlled; if yes, modifying the steering wheel turning angle as 0.

The present invention further provides an apparatus for building a smart vehicle control model, the apparatus comprising:

a sample acquiring unit configured to acquire sample data which comprise corresponding steering wheel turning angles under driving environments;

a feature extracting unit configured to extract vehicle state features and road condition features from the sample data;

a model training unit configured to use the extracted features to train a neural network model to obtain the smart vehicle control model.

According to a preferred embodiment of the present invention, the vehicle state features comprise one of transverse speed, longitudinal speed, and yaw angular speed or any combination thereof;

the road condition features comprise one of a transverse deviation between the vehicle and a reference lane, a heading angle deviation between a heading direction of the vehicle and a reference lane line, and a road curvature or any combination thereof.

According to a preferred embodiment of the present invention, the apparatus further comprises:

a test evaluation unit configured to perform test evaluation for the smart vehicle control model;

a model optimizing unit configured to optimize the smart vehicle control model using the evaluation result.

According to a preferred embodiment of the present invention, the test evaluation unit is specifically configured to:

dock the smart vehicle control model with a vehicle model in a simulated manner, wherein vehicle state features and road condition features are obtained from the vehicle model and input into the smart vehicle control model, and the steering wheel turning angle output by the smart vehicle control model is input into the vehicle model;

perform test by simulating various driving environments;

compare test results with anticipated results.

According to a preferred embodiment of the present invention, the model optimizing unit is specifically configured to consider test data that the test results complies with the anticipated results as sample data, and trigger iterative optimization for the smart vehicle control model.

The present invention further provides a smart vehicle control apparatus, comprising:

a feature extracting unit configured to extract vehicle state features and road condition features of a vehicle to be controlled;

a turning angle extracting unit configured to input the extracted features into the smart vehicle control model to obtain a steering wheel turning angle;

a control processing unit configured to control the vehicle to be controlled using the steering wheel turning angle;

wherein the smart vehicle control model is built by using the apparatus for building the smart vehicle control model.

According to a preferred embodiment of the present invention, the vehicle state features comprise one of transverse speed, longitudinal speed, and yaw angular speed or any combination thereof;

the road condition features comprise one of a transverse deviation between the vehicle to be controlled and a reference lane, a heading angle deviation between a heading direction of the vehicle to be controlled and a reference lane line, and a road curvature or any combination thereof.

According to a preferred embodiment of the present invention, the control processing unit is specifically configured to judge whether the steering wheel turning angle is smaller than or equal to a preset turning angle threshold; if no, use the steering wheel turning angle to control the vehicle to be controlled; if yes, modify the steering wheel turning angle as 0.

As can be seen from the above technical solutions, the present invention builds the smart vehicle control model in a machine learning manner, does not require manual parameter regulation and reduces man power costs caused by parameter regulation.

DETAILED DESCRIPTION OF PREFERRED EMBODIMENTS

The present invention will be described in detail in conjunction with figures and specific embodiments to make objects, technical solutions and advantages of the present invention clearer.

Terms used in embodiments of the present invention are only intended to describe specific embodiments, not to limit the present invention. "a", "said" and "the" in singular forms used in embodiments and appended claims of the present invention are also intended to include plural forms, unless other senses are clearly defined in the context.

It should be appreciated that the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

Depending on the context, the word "if" as used herein may be construed as "at the time when . . . " or "when . . . " or "responsive to determination" or "responsive to detection". Similarly, depending on the context, phrases "if . . . is determined" or "if (a stated condition or event) . . . is detected" may be construed as "when . . . is determined" or "responsive to determination" or "when (a stated condition or event) . . . is detected" or "responsive to detection of (stated condition or event)".

A core ideal of the present invention lies in training a smart vehicle control model in advance using a neural network, and then using the smart vehicle control model to implement control of the smart vehicle steering wheel. That is to say, the present invention mainly comprises two phases: a model training phase and vehicle control phase. Specific implementation of the two phases will be described below in detail in conjunction with embodiments.

Figure 1:
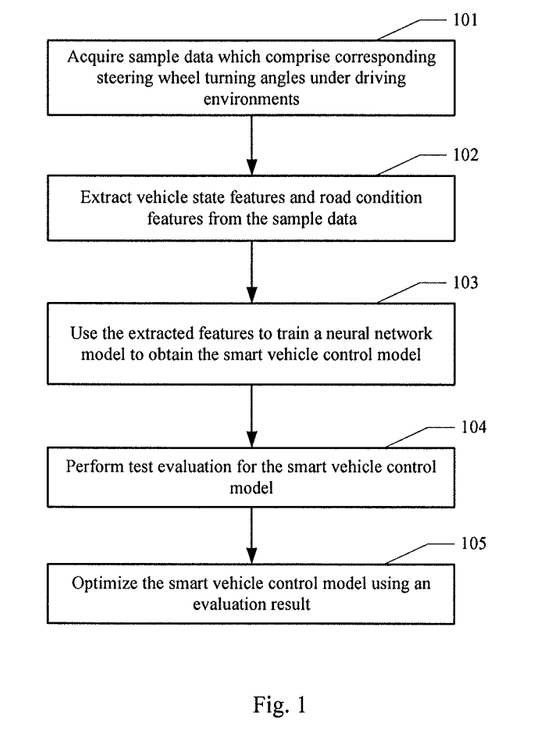
FIG. 1 is a flow chart of a method of building a smart vehicle control model according to an embodiment of the present invention.

FIG. 1 is a flow chart of a method of building a smart vehicle control model according to an embodiment of the present invention. This method relates to implementation of the model training phase. As shown in FIG. 1, the method may comprise the following steps:

In 101, sample data is acquired and comprise corresponding steering wheel turning angles under driving environments.

In the present embodiment of the present invention, the corresponding steering wheel turning angles under driving environments may be acquired in advance, but it needs to be ensured that the acquired steering wheel turning angles are preferable control manners, wherein the driving environments refer to various road conditions and vehicle states covered as many as possible.

There are many manners of acquiring sample data. Two examples are taken here: for example, an experienced driver may drive the vehicle under driving environments, and sample data are acquired during this procedure. Again for example, corresponding steering wheel turning angles under different driving environments are obtained by constructing different driving environments and using currently mature PID algorithm.

The larger the amount of the sample data is, the precise the trained model is. Hence, the sample data acquired preferably in embodiments of the present invention are at a level of hundreds of thousands.

In 102, vehicle state features and road condition features are extracted from the sample data.

As far as model training is concerned, feature selection is very crucial and it decides a decision-making effect of the model to a great degree. As far as the present invention is concerned, there are massive various features for selection in a specific driving environment. If the feature is selected improperly, the performance of the trained model will be affected. Selection of features for model training requires repeated research, experiments, amendment and analysis.

For example, during experiment, the steering wheel turning angle at a previous moment is taken as one of the features, and the resultant smart vehicle control model obtained after training exhibits an undesirable control of direction. The following reason is obtained after a lot of analysis is performed: the steering wheel turning angle at the previous moment causes the smart vehicle control model to substantially depend thereon so that a variable truly closely related to direction control is suppressed, so an undesirable decision-making effect is output. After obtaining the reason after analysis, the Inventor decisively abandons the steering wheel turning angle at the previous moment as the feature.

After repeated and substantial research, experiments, amendment and analysis, two types of features are employed in embodiments of the present invention to perform the training of the smart vehicle control model: vehicle state features and road condition features, wherein the vehicle state features may comprise one of transverse speed, longitudinal speed, and yaw angular speed or any combination thereof; the road condition features may comprise one of transverse deviation, heading angle deviation and road curvature or any combination thereof, wherein the transverse deviation refers to a distance between the vehicle and a reference lane, and heading angle deviation refers to a deflection angle between the vehicle heading direction and a reference lane line. As a preferred embodiment, the above six features, namely, transverse speed, longitudinal speed, yaw speed, transverse deviation, heading angle deviation and road curvature of the vehicle, are selected, and subsequently the six features are described as features for model training by way of an example.

In 103, the extracted features are used to train a neural network model to obtain a smart vehicle control model.

In the present embodiment of the present invention, use of the neural network model upon selecting a machine learning model is mainly based on considerations in the following aspects: first, this manner employs a smaller number of features, so a linear regression manner is not suitable, otherwise a larger training error will be caused; secondly, although a kernel function manner can result in a smaller generalization error, selection of the kernel function is very difficult. Hence, model training is performed in a neural network manner in the embodiment of the present invention.

Various neural network models may be employed, such as convolutional neural network (CNN), feedforward full connection neural network (FNN) and the like.

The draining procedure of the neural network model is described briefly as follows:

Data employed upon model training comprise:

1) Features: feature[0], feature[1], . . . feature[5] are used respectively to represent values of the employed six features.

2) Steering wheel turning angle represented by a label.

Normalization processing is performed for the label. Normalization is performed as follows according to a maximum value max of the steering wheel turning angle and a minimum value min of the steering wheel turning angle:

$$\text{label}'=(\text{label}-\text{min})/(\text{max}-\text{min}) \quad (1)$$

wherein label' is the steering wheel turning angle after the normalization.

Normalization processing is performed for features. The normalization is performed as follows according to an average value and a standard deviation of values of features:

$$\text{model\_input}[i]=(\text{feature}[i]-\text{mean}[i])/\text{var}[i] \quad (2)$$

wherein model_input[i] is a value after feature[i] is normalized, mean[i] is an average value of feature[i], and var[i] is a standard deviation of feature [i].

Model parameter matrixes are A, B, C and D, wherein matrix A is a matrix with 6 rows and 128 columns, matrix B is a matrix with one row and 128 columns, matrix C is a matrix with 128 rows and one column, and matrix D is a matrix with one row and one column, wherein 128 refers to the number of nodes in a concealed layer of the neural network. 128 is taken as an example here, or other values may also be taken. The training procedure is a procedure for determining the four model parameter matrixes. Upon onset of the training, the four model parameter matrixes are first initialized, namely, an initial value is endowed to them.

Model training is performed according to the following formulas:

$$\text{layer}=\tan h(\text{model\_input}*A+B) \quad (3)$$

$$\text{label}'=\text{layer}*C+D \quad (4)$$

wherein model_input is a matrix comprised of model_input[0], model_input[1], model_input[2], model_input[3], model_input[4] and model_input[5].

The smart vehicle control model is obtained after the sample data are used to perform the training of the neural network model. Input of the smart vehicle control model is six characteristics, and output thereof is the steering wheel turning angle.

After the above training is completed, the following steps may be further executed to master and improve the precision of the model.

In 104, test evaluation is performed for the smart vehicle control model.

When test evaluation is performed for the model resulting from the training, the smart vehicle control model may be docked with a vehicle model in a simulated manner. The vehicle model refers to a model capable of simulating a real smart vehicle to drive in a driving environment in a simulated environment. Control parameters are input into the vehicle model, the vehicle model can be driven in a simulated manner under control of the control parameters to thereby output various vehicle state information and road condition information.

Upon docking in this step, vehicle state features and road condition features, namely, transverse speed, longitudinal speed, yaw speed, transverse deviation, heading angle deviation and road curvature, are obtained from the vehicle model, these features are input into the smart vehicle control model, the smart vehicle control model outputs the steering wheel turning angle, and the steering wheel turning angle serves an input for the vehicle model. Simulation is performed for various driving environment in this way, for example, test is performed in a simulated manner for a straight road and curved roads with various curvature and radians, and test results are compared with anticipated results. For example, the steering wheel turning angle is determined using PID algorithm in the same driving environment, and a result determined by using PID algorithm serves as an anticipated result.

In 105, the smart vehicle control model is optimized using the evaluation result.

Test data that the test result complies with the anticipated result may serve as sample data, and are further used to perform iterative optimization for the smart vehicle control model until a coincidence situation of the test result and the anticipated result meets a predetermined requirement.

Figure 2:
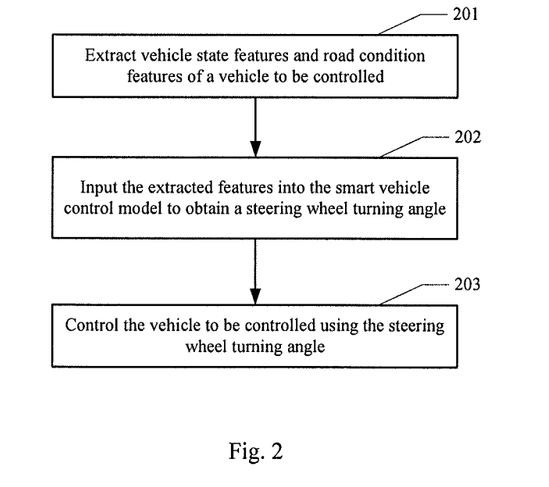
FIG. 2 is a flow chart of a smart vehicle control method according to an embodiment of the present invention.

FIG. 2 is a flow chart of a smart vehicle control method according to an embodiment of the present invention. The method relates to implementation of the vehicle control phase. As shown in FIG. 2, the method may comprise the following steps:

In 201, vehicle state features and road condition features of a vehicle to be controlled are extracted.

In this step, features extracted from the vehicle to be controlled correspond to features extracted upon training the smart vehicle control model, that is to say, features employed upon training the vehicle control model are features extracted in this step.

The vehicle state features may comprise one of transverse speed, longitudinal speed, and yaw angular speed or any combination thereof; the road condition features may comprise one of transverse deviation, heading angle deviation and road curvature or any combination thereof. As a preferred embodiment, the above six features, namely, transverse speed, longitudinal speed, yaw speed, transverse deviation, heading angle deviation and road curvature of the vehicle, are selected.

In 202, the extracted features are input into the smart vehicle control model to obtain a steering wheel turning angle.

After the extracted features are input into the smart vehicle control model built in the embodiment shown in FIG. 1, the smart vehicle control model can output the steering wheel turning angle.

In 203, the vehicle to be controlled is controlled using the obtained steering wheel turning angle.

This step is in fact performing control for the steering wheel of the vehicle to be controlled according to the steering wheel turning angle, the obtained steering wheel turning angle may be provided, as a control parameter, to a control system, and the control system controls the steering wheel of the vehicle to be controlled so that the steering wheel of the vehicle to be controlled turns by a corresponding turning angle.

Since it is probable that upon acquisition of sample data, there might be a situation with a single covered scenario so that the sample data lack a situation with an excessive heading direction deviation, it is possible that the vehicle begins to drive with an excessive angular deviation on a straight road, thereby causing an effect that the vehicle takes an S course on the straight road. To cope with this situation, the sample data may be increased to cover this situation on the one hand; and on the other hand, logical judgment may be increased, that is, judgment is made as to whether the steering wheel turning angle is smaller than or equal to a preset turning angle threshold; if no, the steering wheel turning angle is used to control the vehicle to be controlled; if yes, the steering wheel turning angle is modified as 0.

For example, the turning angle threshold may be preset as ±0.8 degrees. If the steering wheel turning angle obtained by the smart vehicle control model is between ±0.8 degrees, the steering wheel turning angle is modified as 0, namely, the steering wheel turning angle of the vehicle to be controlled is not changed. Wherein positive and negative values of the steering wheel turning angle represent turning angles in two directions, e.g., a positive value represents a turning angle in a clockwise direction, and a negative value represents a turning angle in a counter-clockwise direction.

The model training phase shown in FIG. 1 may be a pre-executed procedure. The vehicle control model obtained through the training in this step may be pre-built in the smart vehicle to perform real-time control for the smart vehicle according to the processing of the vehicle control phase shown in FIG. 2. After the vehicle control model is updated, it may be distributed to the smart vehicle again so that the smart vehicle updates the local smart vehicle control model.

Alternatively, the vehicle control model may be in a server, the smart vehicle uploads feature data to the server in real time, the server obtains the data of the steering wheel turning angle according to the processing of the vehicle control phase shown in FIG. 2, and sends the data to the smart vehicle to implement real-time control of the smart vehicle.

The method provided by the present invention is described above. The apparatus provided by the present invention will be described below in detail in conjunction with embodiments.

Figure 3:
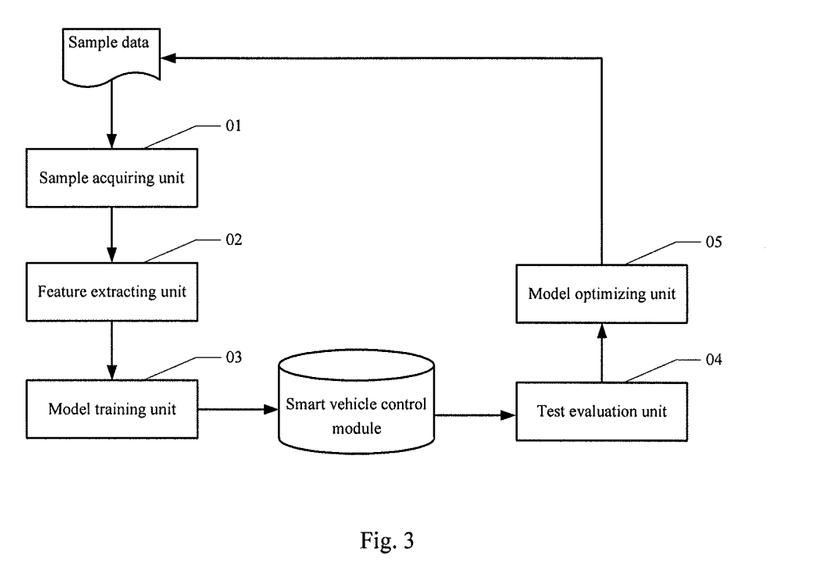
FIG. 3 is an apparatus of building a smart vehicle control model according to an embodiment of the present invention.

FIG. 3 is an apparatus for building a smart vehicle control model according to an embodiment of the present invention. As shown in FIG. 3, the apparatus may comprise: a sample acquiring unit 01, a feature extracting unit 02 and a model training unit 03, and may further comprise a test evaluation unit 04 and a model optimizing unit 05, wherein the respective units have the following main functions:

The sample acquiring unit 01 is configured to acquire sample data which comprise corresponding steering wheel turning angles under driving environments. The sample data obtained by the sample acquiring unit 01 need try to ensure that the acquired steering wheel turning angles are preferable control manners, wherein the driving environments refer to various road conditions and vehicle states covered as many as possible.

There are many manners of acquiring sample data. Two examples are taken here: for example, an experienced driver may drive the vehicle under driving environments, and sample data are acquired during this procedure. Again for example, corresponding steering wheel turning angles under different driving environments are obtained by constructing different driving environments and using currently mature PID algorithm.

The feature extracting unit 02 is configured to extract vehicle state features and road condition features from the sample data, wherein the vehicle state features may comprise one of transverse speed, longitudinal speed, and yaw angular speed or any combination thereof; the road condition features may comprise one of transverse deviation, heading angle deviation and road curvature or any combination thereof, wherein the transverse deviation refers to a distance between the vehicle and a reference lane, and heading angle deviation refers to a deflection angle between the vehicle heading direction and a reference lane line. As a preferred embodiment, the above six features, namely, transverse speed, longitudinal speed, yaw speed, transverse deviation, heading angle deviation and road curvature of the vehicle, are selected.

The model training unit 03 is configured to use the extracted features to train a neural network model to obtain the smart vehicle control model, wherein the neural network model may include but is not limited to CNN, FNN and the like.

The test evaluation unit 04 is configured to perform test evaluation for the smart vehicle control model. Specifically, the smart vehicle control model may be docked with a vehicle model in a simulated manner, wherein vehicle state features and road condition features are obtained from the vehicle model and input into the smart vehicle control model, and the steering wheel turning angle output by the smart vehicle control model is input into the vehicle model; test is performed by simulating various driving environments; test results are compared with anticipated results.

The model optimizing unit 05 is configured to optimize the smart vehicle control model using the evaluation result. Specifically, test data that the test result complies with the anticipated result may serve as sample data, and trigger iterative optimization for the smart vehicle control model. That is, the model optimizing unit 05 considers test data that the test result complies with the anticipated result as sample data, and triggers the feature extracting unit 02 to begin to extract the features and triggers the model training unit 03 to continue to train the neural network model.

Figure 4:
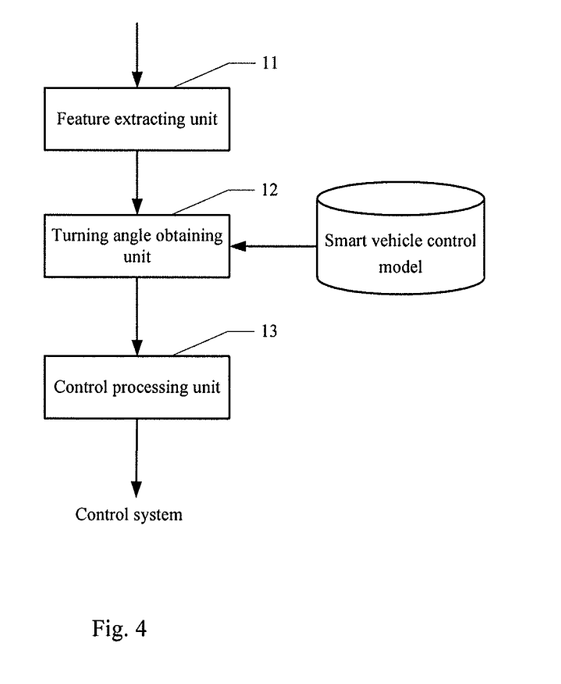
FIG. 4 is a block diagram of a smart vehicle control apparatus according to an embodiment of the present invention.

FIG. 4 is a block diagram of a smart vehicle control apparatus according to an embodiment of the present invention. The apparatus may implement control of the steering wheel of the smart vehicle based on the smart vehicle control model built by the apparatus shown in FIG. 3. As shown in FIG. 4, the apparatus may comprise a feature extracting unit 11, a turning angle obtaining unit 12 and a control processing unit 13. The respective units have the following main functions:

The feature extracting unit 11 is configured to extract vehicle state features and road condition features of a vehicle to be controlled, wherein the vehicle state features may comprise one of transverse speed, longitudinal speed, and yaw angular speed or any combination thereof; the road condition features comprise one of a transverse deviation between the vehicle to be controlled and a reference lane, a heading angle deviation between a heading direction of the vehicle to be controlled and a reference lane line, and a road curvature or any combination thereof. The features extracted by the feature extracting unit 11 accord with those extracted by the feature extracting unit 02 in FIG. 3.

The turning angle extracting unit 12 is configured to input the extracted features into the smart vehicle control model to obtain a steering wheel turning angle.

The control processing unit 13 is configured to control the vehicle to be controlled using the steering wheel turning angle. The control processing unit 13 may provide the obtained steering wheel turning angle, as a control parameter, to a control system of the vehicle to be controlled, and the control system controls the lo steering wheel so that the steering wheel of the vehicle to be controlled turns by a corresponding turning angle.

Since it is probable that upon acquisition of sample data, there might be a situation with a single covered scenario so that the sample data lack a situation with an excessive heading direction deviation, it is possible that the vehicle begins to drive with an excessive angular deviation on a straight road, thereby causing an effect that the vehicle takes an S course on the straight road. To cope with this situation, the control processing unit 13 may judge whether the steering wheel turning angle is smaller than or equal to a preset turning angle threshold; if no, the steering wheel turning angle is used to control the vehicle to be controlled; if yes, the steering wheel turning angle is modified as 0.

As can be seen from the above depictions, the method and apparatus provided by the present invention may have the following advantages:

1) The present invention builds the smart vehicle control model in a machine learning manner, does not require manual parameter regulation and reduces man power costs caused by parameter regulation.

2) Experiments show that the above method and apparatus provided by embodiments of the present invention enable control of the smart vehicle to well cope with curved roads with different curvatures and radians, and enables dependence on sensors to be superior to PID algorithm on the premise that the road information is limited.

In the embodiments provided by the present invention, it should be understood that the revealed apparatus and method can be implemented through other ways. For example, the embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present invention, functional units can be integrated in one processing unit, or they can be separate physical presences; or two or more units can be integrated in one unit. The integrated unit described above can be realized in the form of hardware, or they can be realized with hardware and software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present invention. The aforementioned storage medium includes various media that may store program codes, such as U disk, removable hard disk, read-only memory (ROM), a random access memory (RAM), magnetic disk, or an optical disk.

The foregoing is only preferred embodiments of the present invention, not intended to limit the invention. Any modifications, equivalent replacements, improvements and the like made within the spirit and principles of the present invention, should all be included in the present invention within the scope of protection.

What is claimed is:

1. A computer implemented method for building a smart vehicle control model for smart vehicle control, comprising:
acquiring sample data which comprises corresponding steering wheel turning angles under driving environments;
extracting vehicle state features and road condition features from the sample data; and using the extracted features to train a neural network model to obtain the smart vehicle control model.

2. The method according to claim 1, wherein the vehicle state features comprise one of transverse speed, longitudinal speed, and yaw angular speed or any combination hereof;

the road condition features comprise one of a transverse deviation between the vehicle and a reference lane, a heading angle deviation between a heading direction of the vehicle and a reference lane line, and a road curvature or any combination thereof.

3. The method according to claim 1, wherein the method further comprises:

performing test evaluation for the smart vehicle control model;

optimizing the smart vehicle control model using an evaluation result.

4. The method according to claim 3, wherein the performing test evaluation for the smart vehicle control model comprises:

docking the smart vehicle control model with a vehicle model in a simulated manner, wherein vehicle state features and road condition features are obtained from the vehicle model and input into the smart vehicle control model, and the steering wheel turning angle output by the smart vehicle control model is input into the vehicle model;

performing test by simulating various driving environments;

comparing test results with anticipated results.

5. The method according to claim 3, wherein the optimizing the smart vehicle control model using the evaluation result comprises:

considering test data that the test results complies with the anticipated results as sample data, and performing iterative optimization for the smart vehicle control model.

6. The method according to claim 1, further comprising:

extracting vehicle state features and road condition features of a vehicle to be controlled;

inputting the extracted features into the smart vehicle control model to obtain a steering wheel turning angle; and controlling the vehicle using the steering wheel turning angle.

7. The method according to claim 6, wherein the vehicle state features comprise one of transverse speed, longitudinal speed, and yaw angular speed or any combination thereof;

the road condition features comprise one of a transverse deviation between the vehicle to be controlled and a reference lane, a heading angle deviation between a heading direction of the vehicle to be controlled and a reference lane line, and a road curvature or any combination thereof.

8. The method according to claim 6, wherein the controlling the vehicle to be controlled using the steering wheel turning angle comprises:

judging whether the steering wheel turning angle is smaller than or equal to a preset turning angle threshold; if no, using the steering wheel turning angle to control the vehicle to be controlled; if yes, modifying the steering wheel turning angle as 0.

9. An apparatus for building a smart vehicle control model for smart vehicle control, comprising:

at least one processor; and a memory storing instructions, which when executed by the at least one processor, cause the at least one processor to perform operations, the operations comprising:

acquiring sample data which comprises corresponding steering wheel turning angles under driving environments;

extracting vehicle state features and road condition features from the sample data; and using the extracted features to train a neural network model to obtain the smart vehicle control model.

10. The apparatus according to claim 9, wherein the vehicle state features comprise one of transverse speed, longitudinal speed, and yaw angular speed or any combination hereof;

the road condition features comprise one of a transverse deviation between the vehicle and a reference lane, a heading angle deviation between a heading direction of the vehicle and a reference lane line, and a road curvature or any combination thereof.

11. The apparatus according to claim 9, wherein the operations further comprises:

performing test evaluation for the smart vehicle control model;

optimizing the smart vehicle control model using the evaluation result.

12. The apparatus according to claim 11, wherein the operation of performing test evaluation for the smart vehicle control model comprises:

docking the smart vehicle control model with a vehicle model in a simulated manner, wherein vehicle state features and road condition features are obtained from the vehicle model and input into the smart vehicle control model, and the steering wheel turning angle output by the smart vehicle control model is input into the vehicle model;

performing test by simulating various driving environments;

comparing test results with anticipated results.

13. The apparatus according to claim 11, wherein the operation of optimizing the smart vehicle control model using the evaluation result comprises:

considering test data that the test results complies with the anticipated results as sample data, and performing iterative optimization for the smart vehicle control model.

14. The apparatus according to claim 9, the operations further comprising:

extracting vehicle state features and road condition features of a vehicle to be controlled;

inputting the extracted features into the smart vehicle control model to obtain a steering wheel turning angle; and controlling the vehicle using the steering wheel turning angle.

15. The apparatus according to claim 14, wherein the vehicle state features comprise one of transverse speed, longitudinal speed, and yaw angular speed or any combination thereof;

the road condition features comprise one of a transverse deviation between the vehicle to be controlled and a reference lane, a heading angle deviation between a heading direction of the vehicle to be controlled and a reference lane line, and a road curvature or any combination thereof.

16. The apparatus according to claim 14, wherein the operation of controlling the vehicle to be controlled using the steering wheel turning angle comprises:
   judging whether the steering wheel turning angle is smaller than or equal to a preset turning angle threshold; if no, using the steering wheel turning angle to control the vehicle to be controlled; if yes, modifying the steering wheel turning angle as 0.

17. A non-transitory computer storage medium, wherein the computer storage medium is coded with a computer program, and when the program is executed by one or more computers, the one or more computers perform the following operations:
   acquiring sample data which comprises corresponding steering wheel turning angles under driving environments;
   extracting vehicle state features and road condition features from the sample data;
   using the extracted features to train a neural network model to obtain the smart vehicle control model.

18. The non-transitory computer storage medium according to claim 17, wherein the operations further comprise:
   extracting vehicle state features and road condition features of a vehicle to be controlled;
   inputting the extracted features into the smart vehicle control model to obtain a steering wheel turning angle;
   controlling the vehicle using the steering wheel turning angle.

* * * * *